United States Patent

[11] 3,578,985

[72] Inventor Alvin W. Edson
 Baldwinsville, N.Y.
[21] Appl. No. 795,859
[22] Filed Feb. 3, 1969
[45] Patented May 18, 1971
[73] Assignee General Electric Company

[54] PARABOLIC WAVEFORM GENERATING CIRCUIT
 5 Claims, 2 Drawing Figs.
[52] U.S. Cl. ............................................. 307/229,
 307/228, 307/261, 328/127, 328/142, 328/158
[51] Int. Cl. ....................................................... G06g 7/12
[50] Field of Search ........................................... 307/228,
 229, 260, 261, 313; 328/127, 142—145, 156, 158,
 178

[56] References Cited
UNITED STATES PATENTS
3,210,558 10/1965 Owen ........................... 307/229(X)
3,444,393 5/1969 Sassler ......................... 307/229

Primary Examiner—Stanley D. Miller, Jr.
Attorneys—Marvin A. Goldenberg, Richard V. Lang, Frank L. Neuhauser and Oscar B. Waddell ABSTRACT: A parabolic generator circuit for generating a smooth parabolic waveform that is stable and free of distortion, and which circuit is of a relatively simple circuit configuration. The circuit includes a constant current source and a sawtooth current source in combination with a capacitor to which is applied current equal to the difference between the fixed and sawtooth currents, the capacitor integrating the applied current so as to generate said parabolic voltage.

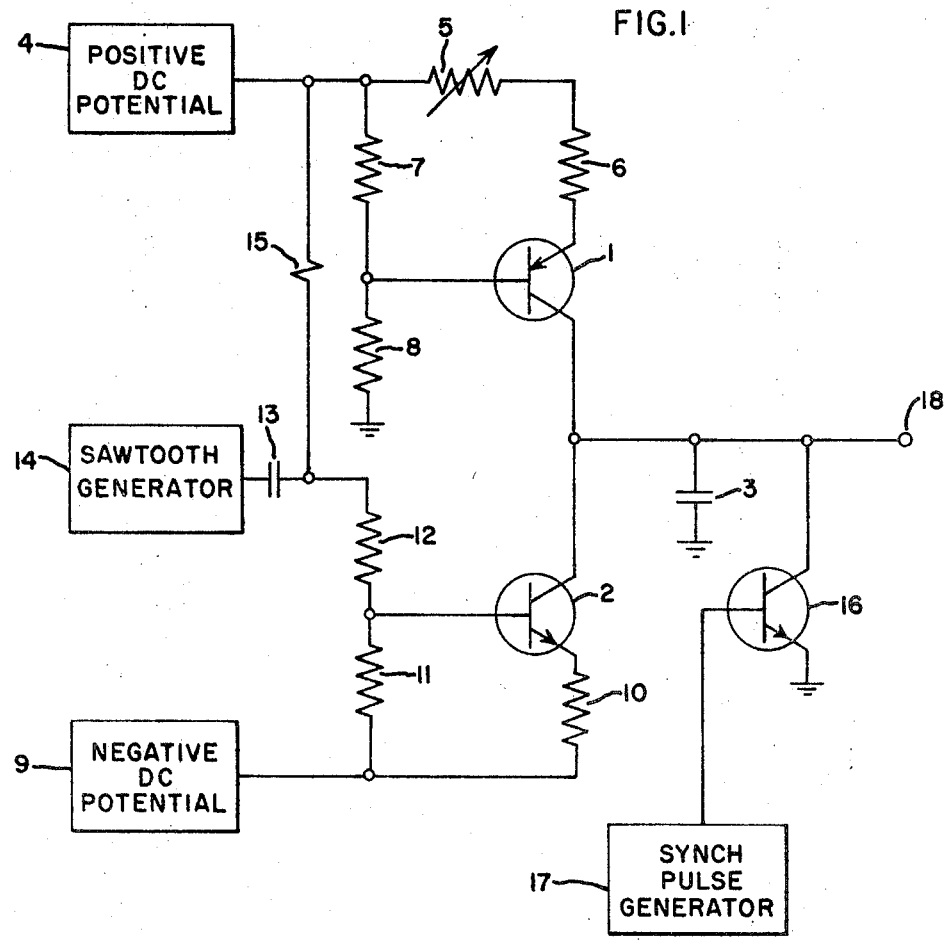

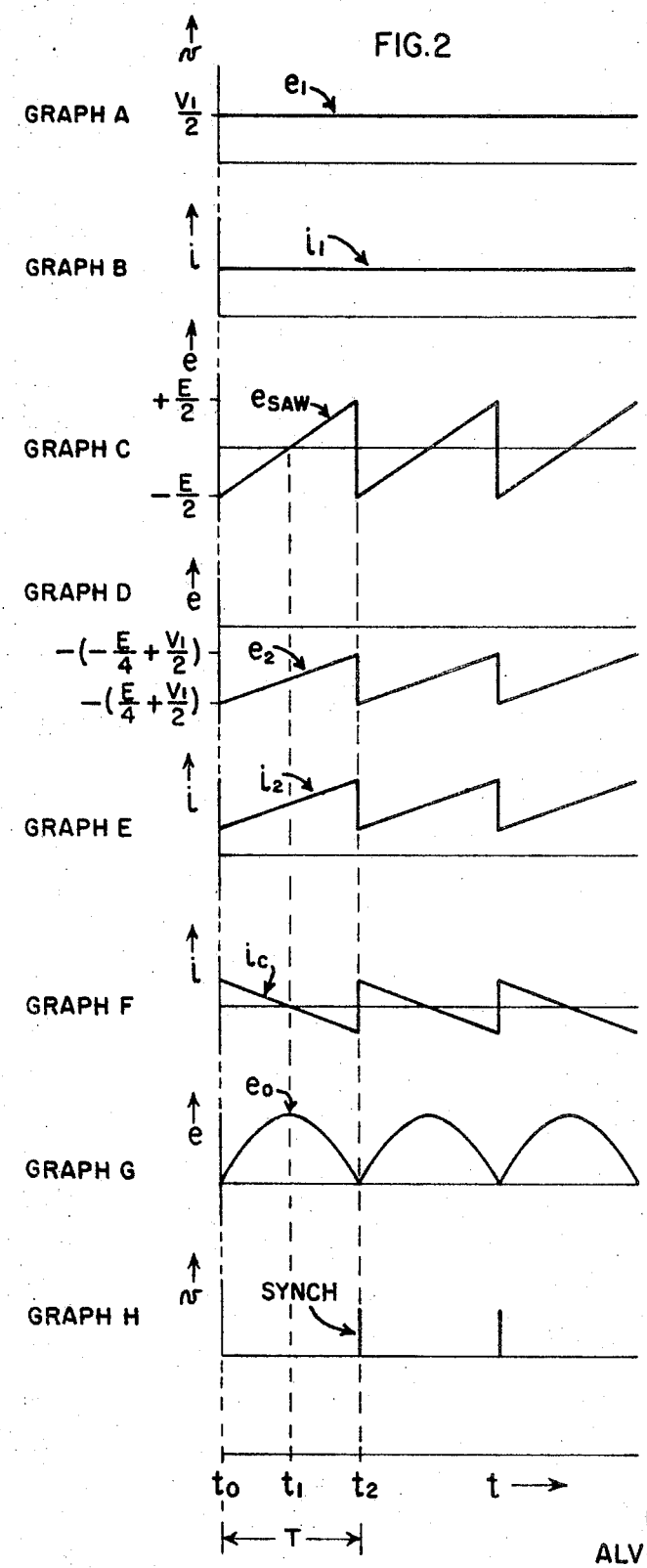

PARABOLIC WAVEFORM GENERATING CIRCUIT

BACKGROUND OF THE INVENTION

1. Field of the Invention

The invention herein described was made in the course of or under a contract or subcontract thereunder with the Defense Communications Agency.

The invention relates to the field of waveform generators, in particular parabolic waveform generators.

2. Description of the Prior Art

Various circuit configurations have been employed in the prior art for generating parabolic waveforms. However, these circuits are either of considerable complexity or tend to introduce distortions. The simplest circuit employed is an R-C integrator, where a capacitor is charged and discharged through a resistance by means of a bipolar sawtooth waveform. The generated parabolic waveform is accompanied by an exponential distortion and spikes from retrace of the sawtooth waveform. In another circuit, the square law characteristics of diodes and saturated transistors are utilized for generating a parabola in response to a directly applied synchronization pulse. Because these modes of operation are in unstable regions, considerable DC and parabolic drift are encountered. In still another approach, a special cathode ray tube capable of performing various analog computations may be employed for generating a parabolic waveform. Devices of this type are relatively complex structures, requiring a considerable amount of external circuitry, and are not suitable as an economical means for parabolic generation.

SUMMARY OF THE INVENTION

It is accordingly an object of the present invention to provide a novel parabolic waveform generator circuit which is of a relatively simple and economical circuit configuration, and yet one which generates a stable parabolic waveform free of distortion.

Another object of the invention is to provide a novel parabolic waveform generator circuit which may readily be constructed using integrated fabrication techniques.

These and other objects of the invention are accomplished by a circuit which includes first and second current generators, one of which delivers a constant DC current and the other a sawtooth current, in combination with an integrating capacitor. The current generators include a pair of high current gain transistors of complementary type serially connected in a balanced circuit configuration. The capacitor is connected at the junction of the transistor devices so that the capacitor current is equal to the difference between the constant and sawtooth currents. The sawtooth current is centered about the constant current and provides, successively, linear charging and discharging of the capacitor during each period of the sawtooth waveform. The capacitor integrates the current applied thereto so as to generate a parabolic output voltage.

BRIEF DESCRIPTION OF THE DRAWING

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

FIG. 1 is a schematic circuit diagram of a parabolic waveform generator circuit in accordance with the invention; and FIG. 2 is a series of graphs of voltage and current waveforms associated with the circuit of FIG. 1.

DESCRIPTION OF THE PREFERRED EMBODIMENT

With reference to FIG. 1, there is illustrated as schematic circuit diagram of a parabolic waveform generator circuit in accordance with the invention which comprises a first current source for generating a constant current including an emitter follower PNP transistor 1, a second current source in series with the first for generating a sawtooth current including a complementary emitter follower NPN transistor 2, and an energy storage device in the form of a capacitor 3. Transistors 1 and 2 are preferably high current gain devices so that good current sources are provided. A parabolic voltage is generated across capacitor 3 that is a clean waveform devoid of distortions and undesirable harmonic content.

In addition to transistor 1, the constant current source includes a positive DC potential source 4 connected through an adjustable current limiting resistor 5 and a fixed resistor 6 to the emitter of PNP transistor 1, the collector electrode of which is connected to the ungrounded terminal of the capacitor 3. The DC source 2 is further connected through a pair of voltage divider resistors 7 and 8 to ground, the junction of resistors 7 and 8 being connected to the base electrode of transistor 1.

The NPN transistor 2 of the sawtooth current source has its collector joined with the collector of transistor 1 to the ungrounded terminal of capacitor 3. A negative DC potential source 9 is connected through a fixed current limiting resistor 10 to the emitter electrode of transistor 2. It is further connected through a pair of voltage divider resistors 11 and 12 and AC coupling capacitor 13 to a sawtooth generator source 14, which may be of conventional type, the junction of resistors 11 and 12 being connected to the base electrode of transistor 2. A resistor 15 is connected between the junction of capacitor 13 and resistor 12 and DC source 4 for balancing the DC bias currents. An NPN transistor 16 is connected across the capacitor 3, with the emitter connected to ground. A synchronous pulse generator 17 supplies an input to the base electrode of transistor 16. The transistor is operated in a switching mode for periodically clamping the capacitor to ground at the cusps of the output parabolic voltage generated between the output terminal 18 and ground.

In a preferred embodiment of the invention the positive DC potential of source 4 is at $+V_1$ and the negative DC potential of source 9 is equal and opposite at $-V_1$. Resistors 7 and 8 are of equal value so that the voltage $e_1$ at the base electrode of transistor 1 is V1/2, as shown in Graph A of FIG. 2. Since transistor 1 is connected as an emitter follower, current $i_1$ through transistor 1 is proportional to the voltage $e_1$. This current is shown in Graph B. A sawtooth signal voltage $e_{saw}$ generated by source 14 and AC coupled through capacitor 13 is a single sawtooth waveform, and is shown in Graph C. The resistors 11 and 12 are of equal value and their sum equal to the value of resistor 15 so that the voltage $e_{saw}$ is centered about ground and a single sweep may be expressed as $$e_{saw} = \frac{E}{T}t - \frac{E}{2}$$

where E is the peak-to-peak voltage and T is one sawtooth period. The voltage $e_2$ is applied to the base electrode of transistor 2, and is shown in Graph D. A single sweep may be expressed as $$e_2 = \frac{E}{2T}t - \frac{E}{4} - \frac{V_1}{2}.$$

The current $i_2$ through emitter follower transistor 2, shown in Graph E, is proportional to the base voltage $e_2$. Resistor 10 is approximately equal to the sum of resistors 5 and 6, resistor 5 being adjusted so that in the absence of $e_{saw}$ the currents $i_1$ and $i_2$ are equal. Thus, the current $i_2$ is centered about the constant current $i_1$, i.e., the mean value of $i_2$ is equal to $i_1$. The current $i_c$ through the capacitor 3 is equal to $i_1 - i_2$, and is shown in Graph F. The parabolic output voltage $e_o$ that is generated across the capacitor is a function of the integral of $i_c$, and is shown in Graph G. The capacitance of capacitor 3 determines the peak voltage magnitude of the generated parabolic waveform. The capacitance must be sufficiently large, however, so as to avoid clipping of the parabola.

The following circuit components and parameters were employed in an operable embodiment of the invention:

| | |
|---|---|
| Transistor 1 | Type 2N 1132 |
| Transistor 2 | Type 2N 336 |
| Transistor 16 | Type 2N 2219A |
| Capacitor 3 | $\mu$fd .01 |
| Potential $+V_1$ | volts $+20$ |
| Potential $-V_1$ | do $-20$ |
| Peak to peak sawtooth voltage E. | do 10 |
| Sawtooth signal frequency | kHz 15 |
| Resistor 5 | ohms 0–500 |
| Resistor 6 | do 750 |
| Resistors 7, 8, 11 and 12 | do 10K |
| Resistor 10 | do 1K |

Considering the operation of the circuit of FIG. 1, during the first half period of the sawtooth voltage $e_2$, $i_2 < i_1$ and $i_c$ is a linear charge current. During the second half period of the sawtooth voltage $e_2$, $i_2 > i_1$ and $i_c$ is a linear discharge current. Thus, at time $t_o$ in FIG. 2, when $e_2$ is at its most negative point, current $i_2$ is a minimum and $i_c$ is a maximum positive or charge current. As the voltage $e_2$ becomes less negative, the current $i_2$ increases and the charge current $i_c$ accordingly decreases. At time $t_1$, $e_2$ becomes equal in magnitude to the constant voltage $e_1$, at which point $i_1 = i_2$ and the current $i_c = 0$. As the sawtooth voltage $e_2$ continues to become less negative, $i_2 > i_1$ and $i_c$ becomes negative and a discharge current. The current $i_2$ continues to increase as does the discharge current $i_c$ until the voltage $e_2$ reaches its minimum negative point at $t_2$. Upon retrace of the sawtooth signal, which for purpose of the present discussion is presumed to occur instantaneously, $e_2$ again assumes a maximum negative value. Current $i_2$ changes abruptly to its minimum value and $i_c$ to a charge current, and the process repeats.

Since the capacitor current $i_c$ is a sawtooth waveform centered about zero so as to comprise both charge and discharge current, the output voltage $e_o$ shown in Graph G of FIG. 2, which is proportional to the integral of $i_c$, is a full parabolic waveform referenced to ground potential. The circuit must be balanced as described for avoiding DC drift. Since complementary transistors are employed, any temperature drifts tending to occur would substantially cancel. To further stabilize the circuit, clamping transistor 16 is synchronously operated by narrow synch pulses from generator 17 for clamping the cusps of the parabolic waveform to ground. The synch pulses are shown in Graph H of FIG. 2.

As a further consideration, transistors 1 and 2 are selected to have alpha cutoff frequencies about 10 times greater than the sawtooth signal repetition rate. This permits sufficient harmonic response for providing a smooth parabolic waveform, yet a limited response to higher order harmonics occurring during retrace of the sawtooth signal that would otherwise result in distortion of the output parabolic waveform.

I claim:

1. A circuit for generating a parabolic voltage comprising:
   a. a first current source for producing a constant current,
   b. a second current source for producing a sawtooth current having a mean value equal to the value of said constant current,
   c. means for connecting said first and second current sources in a serial configuration, and
   d. an integrating capacitor coupled to the junction of said first and second current sources having current applied thereto equal to the difference between said constant and sawtooth currents for linearly charging and discharging said capacitor during each sawtooth period, whereby a parabolic voltage is generated across said capacitor.

2. A circuit as in claim 1 having a balanced configuration with the mean voltage of said junction equal to a given reference level and said capacitor connected between said junction and a point fixed to said reference level.

3. A circuit as in claim 2 which includes switching means connected across said capacitor synchronously operated to be normally open and to instantaneously close at the end of each parabolic waveform, thereby shorting said capacitor to said reference level at times when the capacitor current is optimumly at zero.

4. A circuit as in claim 3 wherein:
   a. said first current source includes a first high current gain transistor connected as an emitter follower,
   b. a constant voltage coupled to the base of said first transistor for providing said constant current as proportional thereto,
   c. said second current source includes a second emitter follower connected high current gain transistor of complementary type of said first transistor, and
   d. a sawtooth voltage coupled to the base of said second transistor for providing said sawtooth current as proportional thereto.

5. A circuit as in claim 4 wherein:
   a. said first and second transistors are a complementary PNP-NPN pair,
   b. a first DC bias source is coupled through a first emitter resistance to the emitter of said first transistor and through a first resistive voltage divider circuit to said reference level, a tap on said voltage divider being connected to the base of said first transistor,
   c. a second DC bias source of opposite polarity to said first source is coupled through a second emitter resistance to the emitter of said second transistor and through a second resistive voltage divider circuit to a sawtooth voltage source, a tap of said voltage divider being connected to the base of said second transistor, and
   d. the collectors of said first and second transistors being connected to said junction.